United States Patent
Inaoka et al.

(10) Patent No.: US 9,895,966 B2
(45) Date of Patent: Feb. 20, 2018

(54) WORK VEHICLE

(71) Applicants: KUBOTA CORPORATION, Osaka (JP); AVL LIST GMBH, Graz (AT)

(72) Inventors: Motonari Inaoka, Osaka (JP); Toshihide Shimizu, Osaka (JP); Werner Orth, Kuerten (DE)

(73) Assignees: Kubota Corporation, Osaka (JP); AVL List GMBH, Graz (AT)

( * ) Notice: Subject to any disclaimer, the term of this patent is extended or adjusted under 35 U.S.C. 154(b) by 0 days.

(21) Appl. No.: 14/709,973

(22) Filed: May 12, 2015

(65) Prior Publication Data

US 2016/0031311 A1 Feb. 4, 2016

(30) Foreign Application Priority Data

Aug. 4, 2014 (JP) .................. 2014-158351

(51) Int. Cl.
| | |
|---|---|
| *B60K 11/04* | (2006.01) |
| *F01P 11/00* | (2006.01) |
| *F01P 3/20* | (2006.01) |
| *F01P 3/18* | (2006.01) |

(52) U.S. Cl.
CPC ............... *B60K 11/04* (2013.01); *F01P 3/20* (2013.01); *F01P 11/00* (2013.01); *B60Y 2200/221* (2013.01); *B60Y 2304/074* (2013.01); *F01P 2003/182* (2013.01); *F01P 2003/185* (2013.01); *F01P 2003/187* (2013.01); *F28F 2280/105* (2013.01)

(58) Field of Classification Search
CPC ......... B60K 11/04; B60K 11/02; B60K 11/08; F01P 3/18; F01P 2003/182; F01P 2003/185; F01P 2003/187; F01P 2070/50; F01P 2070/52; F28F 2280/10; F28F 2280/105

See application file for complete search history.

(56) References Cited

U.S. PATENT DOCUMENTS

| | | | |
|---|---|---|---|
| 3,834,478 A | 9/1974 | Alexander et al. | |
| 4,542,785 A * | 9/1985 | Bagnall | F01P 11/06 165/119 |
| 4,696,361 A * | 9/1987 | Clark | F01P 3/18 123/41.43 |
| 5,234,051 A | 8/1993 | Weizenburger et al. | |

(Continued)

FOREIGN PATENT DOCUMENTS

JP  2007-247465  9/2007

OTHER PUBLICATIONS

Notification of Reasons for Refusal issued with respect to counterpart Japan application No. 2014-158351.

*Primary Examiner* — Emma K Frick
(74) *Attorney, Agent, or Firm* — Greenblum & Bernstein, P.L.C.

(57) ABSTRACT

A work vehicle includes an engine mounted to a vehicle body frame. A cooling fan unit is arranged on one side of the engine. A coolant fluid radiator is arranged on an opposite side of the cooling fan unit. A cooling unit is arranged on an opposite side of the coolant fluid radiator. A link mechanism connects the cooling unit such that a distance between the cooling unit and the coolant fluid radiator can be changed. The link mechanism can utilize a four-link mechanism having a pair of upper links and a pair of lower links.

22 Claims, 5 Drawing Sheets

(56) References Cited

U.S. PATENT DOCUMENTS

| | | | |
|---|---|---|---|
| 5,317,880 A * | 6/1994 | Spears | B62D 35/001 188/264 A |
| 6,024,164 A * | 2/2000 | Sorbel | E02F 9/0866 123/41.43 |
| 6,092,616 A * | 7/2000 | Burris | B60K 11/04 180/68.1 |
| 6,622,668 B2 | 9/2003 | Izumi | |
| 6,648,088 B2 | 11/2003 | Gabioli | |
| 6,880,656 B2 | 4/2005 | Pfusterschmid et al. | |
| 7,044,203 B2 | 5/2006 | Yagi et al. | |
| 7,089,994 B2 | 8/2006 | Esposito et al. | |
| 7,284,594 B2 * | 10/2007 | Sanada | F28F 9/002 165/132 |
| 7,370,690 B2 | 5/2008 | Rasset et al. | |
| 7,398,847 B2 * | 7/2008 | Schmitt | B60K 11/04 180/68.4 |
| 7,467,679 B2 | 12/2008 | Honzek et al. | |
| 7,753,152 B2 * | 7/2010 | Nakae | B60K 11/04 165/122 |
| 7,938,215 B2 * | 5/2011 | Leconte | B60K 11/04 165/42 |
| 8,020,536 B2 * | 9/2011 | Kardos | F02B 29/0431 123/542 |
| 8,096,347 B2 * | 1/2012 | Starkey | B60K 11/04 123/41.31 |
| 8,186,751 B2 | 5/2012 | Davisdon et al. | |
| 8,251,438 B2 * | 8/2012 | Linden | B60K 11/04 180/68.4 |
| 8,256,496 B2 * | 9/2012 | Shuttleworth | F01P 5/06 123/41.31 |
| 8,342,277 B2 | 1/2013 | Kotani et al. | |
| 8,479,855 B2 * | 7/2013 | Kim | B60K 11/02 180/68.3 |
| 8,505,499 B2 * | 8/2013 | Hirasawa | B60K 11/04 123/41.01 |
| 8,544,584 B2 * | 10/2013 | Takeda | E02F 9/26 165/41 |
| 8,616,265 B2 * | 12/2013 | Fell | F01P 3/18 165/41 |
| 8,640,803 B2 * | 2/2014 | Kinoshita | B62D 25/10 180/68.1 |
| 8,672,071 B2 * | 3/2014 | Neilson | B60K 11/04 180/68.1 |
| 8,960,342 B2 * | 2/2015 | Werner | B60K 11/04 165/41 |
| 9,109,594 B2 * | 8/2015 | Pawlick | F04B 53/08 |
| 2008/0135209 A1 | 6/2008 | Lowe et al. | |
| 2008/0230291 A1 | 9/2008 | Kersting | |
| 2009/0038775 A1 | 2/2009 | Leconte | |
| 2009/0078394 A1 * | 3/2009 | Weatherup | B60K 11/04 165/51 |
| 2009/0194352 A1 | 8/2009 | Plante et al. | |
| 2011/0277961 A1 * | 11/2011 | Knepper | F01P 3/18 165/104.19 |
| 2014/0202669 A1 * | 7/2014 | Kulesza | B60K 11/04 165/148 |
| 2014/0262147 A1 * | 9/2014 | Pawlick | F28F 9/001 165/67 |
| 2015/0369114 A1 * | 12/2015 | Bruss | F01P 3/00 123/41.33 |

* cited by examiner

WORK VEHICLE

CROSS-REFERENCE TO RELATED APPLICATIONS

The present application claims priority under 35 U.S.C. § 119 of Japanese Application No. 2014-158351, filed on Aug. 4, 2014, the disclosure of which is expressly incorporated by reference herein in its entirety.

BACKGROUND OF THE INVENTION

1. Field of the Invention

The present invention relates to a work vehicle in which a cooling system has a coolant fluid radiator, and a cooling unit adjacent to and facing the coolant fluid radiator.

2. Description of Related Art

In the cooling system described above, it is necessary to move either the coolant fluid radiator or the cooling unit to create a clearance in between the coolant fluid radiator and the cooling unit for maintenance purposes. For example, in a cooling system according to U.S. Pat. No. 8,342,277, a second radiator is movably attached to a first radiator via a first connector and a second connector. The first connector is a swing link mechanism having a slide mechanism and connects upper portions of the first radiator and the second radiator. The second connector is a slide mechanism and connects lower portions of the second radiator and the second radiator. Thus, the upper portion of the second radiator can be significantly separated from the upper portion of the first radiator by swing displacement and slide displacement, and the lower portion of the second radiator can be slightly separated from the bottom portion of the first radiator by slide displacement. As a result, a hand may be inserted between the first radiator and the second radiator. However, such a cooling system requires a swing link mechanism having a slide mechanism and a slide mechanism in order to attach the second radiator to the first radiator, and such an attachment structure is complicated and occupies a large space. A slide mechanism having a long hole and pin, in particular, not only increases manufacturing costs but has the disadvantage of foreign materials easily lodging in the long hole.

In view of the situation above, the present invention provides a technology in which a space for maintenance/inspection purposes is easily created between a coolant fluid radiator and a cooling unit configuring a cooling system for work vehicles.

SUMMARY OF THE INVENTION

A working vehicle according to one aspect of the present invention has a vehicle body frame, an engine mounted to the vehicle body frame, a cooling fan unit provided in one direction of an anteroposterior direction of the vehicle body with respect to the engine, a coolant fluid radiator provided on the opposite side of the cooling fan unit with respect to the engine, a cooling unit provided on the opposite side of the coolant fluid radiator with respect to the cooling fan unit, and a link mechanism connecting the coolant fluid radiator and the cooling unit such that a distance between the cooling unit and the coolant fluid radiator in the anteroposterior direction of the vehicle body can be changed. Further, the link mechanism is configured as a four-link mechanism having a left/right pair of upper links and a left/right pair of lower links.

By installing the four-link mechanism between the coolant fluid radiator and the cooling unit, the cooling unit is swingably supported by the coolant fluid radiator. By swinging the cooling unit using the four-link mechanism, a space is formed between the coolant fluid radiator and the cooling unit, thereby facilitating maintenance/inspection of cooling surfaces thereof. As an additional advantage, the four-link mechanism is simple in structure and low in manufacturing costs.

In a preferred embodiment of the present invention, the cooling unit includes a first cooler provided in an upper half area of the coolant fluid radiator and a second cooler provided in a lower half area of the coolant fluid radiator. The first cooler is connected to the coolant fluid radiator via the link mechanism, and a bottom end of the first cooler and an upper end of the second cooler are connected via a connecting unit. In this configuration, the first cooler and the second cooler are provided facing opposite a cooling surface of the coolant fluid radiator having favorable circulation of cooling air, and cooling air can pass through the two types of coolers in an efficient manner. In such a case, when a swinging connection unit, which swingably conncects the first cooler and the second cooler about a swing axis in a transverse direction of the vehicle body, is adopted as the connecting unit, the second cooler is able to maintain an upright posture despite an inclined posture of the first cooler. When the second cooler has an inclined posture in tandem with the first cooler, the bottom end of the second cooler is significantly separated from the coolant fluid radiator, leading to a swing space of the second cooler becoming too large. The swingable connection of the first cooler and the second cooler resolves this.

When the cooling unit is equipped with a third cooler in addition to the first cooler and the second cooler, the third cooler is preferably provided on the opposite side of the second cooler with respect to the coolant fluid radiator, and is preferably connected to the bottom end of the first cooler. As a result, the third cooler is provided across from the coolant fluid radiator with the second cooler in between. That is, the cooling surface of the coolant fluid radiator and a first cooling surface of the second cooler, and a second cooling surface of the second cooler and an inner cooling surface of the third cooler are nearly parallel and positioned in immediate proximity to one another. During maintenance/inspection, by swinging the first cooler into an inclined posture, the third cooler has a similar inclined posture following along an extension from the first cooler. In contrast, the second cooler maintains an upright posture, and thus a space is formed in between the cooling surface of the coolant fluid radiator and the first cooling surface of the second cooler, and the second cooling surface of the second cooler and the inner cooling surface of the third cooler, thereby facilitating maintenance/inspection.

In considering an appropriate swing posture of the cooling unit with respect to the coolant fluid radiator with the minimum distance between the cooling surfaces required for maintenance/inspection purposes and the space provided for the cooling system as constraints thereto, it was found that a length between each support point of the upper links and the lower links on the coolant fluid radiator side is preferably shorter than a length between each support point of the upper links and the lower links on the cooling unit side, and a length between the support points of the upper links on the coolant fluid radiator side and the support points on the cooling unit side is preferably shorter than a length between the support points of the lower links on the coolant fluid radiator side and the support points on the cooling unit side.

Further, by making the length between each support point of the lower links and the upper links on the coolant fluid radiator side shorter than the length between each support point of the lower links and the upper links on the cooling unit side, an efficient use of space and ease of maintenance/inspection is achieved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1A:
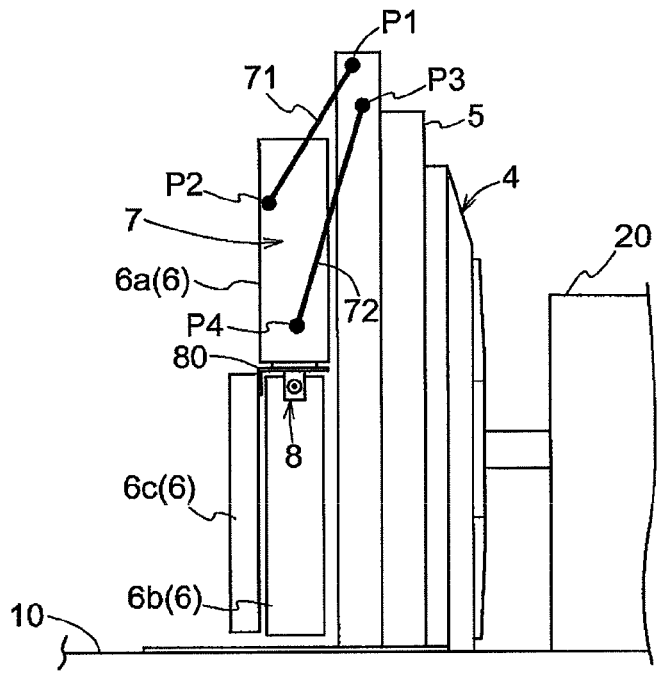
FIGS. 1A and 1B are schematic diagrams illustrating a basic configuration of a cooling system in a work vehicle according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Before describing an embodiment of a work vehicle according to the present invention and specifically a cooling system thereof, a basic configuration of the cooling system is described with reference to FIGS. 1A and 1B. The cooling system utilizes cooling air which passes through a cooling fan unit 4, the cooling fan unit 4 cooling an engine 20 mounted on a vehicle body frame 10. For ease of description, with reference to FIGS. 1A and 1B, the arrangement of each component is explained with the left side of the drawing being the front, and the right side of the drawing being the rear. However, the anteroposterior direction here is unrelated to the anteroposterior direction of the work vehicle (the lengthwise direction of the work vehicle). In other words, the present invention is not limited to the engine 20 being provided forward of the cooling fan unit 4 in the anteroposterior direction of the working vehicle (the lengthwise direction of the vehicle body). The present invention may also include a configuration in which the cooling fan unit 4 is or is not provided forward of the engine 20 and a configuration in which the anteroposterior direction of each device configuring the cooling system is selected freely.

Figure 1B:
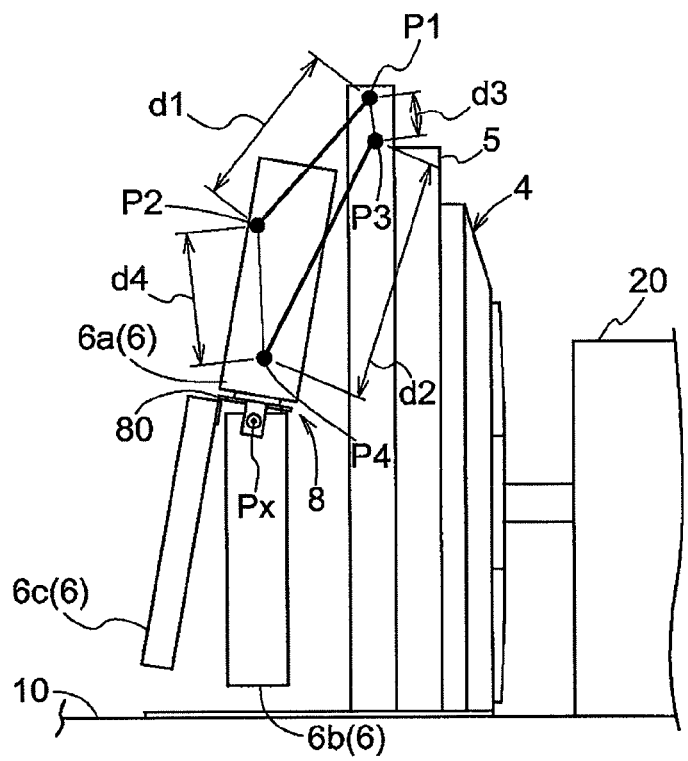

In FIGS. 1A and 1B, the cooling fan unit 4 is attached to a rear surface of a coolant fluid radiator 5. A cooling unit 6 is provided near the front of the coolant fluid radiator 5. The cooling unit 6 is supported by the coolant fluid radiator 5 via a link mechanism 7, such that the cooling unit 6 is swingable in the anteroposterior direction. FIG. 1A illustrates a first swing posture of the link mechanism 7, in which the cooling unit 6 is in a nearly vertical posture and the cooling unit 6 is adjacent to the coolant fluid radiator 5. FIG. 1B illustrates a second swing posture of the link mechanism 7, in which the cooling unit 6 is separated from the coolant fluid radiator 5. This allows for a maintenance person to insert a hand in between the cooling unit 6 and the coolant fluid radiator 5.

The link mechanism 7 is a four-link mechanism having a left/right pair of upper links 71 and a left/right pair of lower links 72. By selecting the appropriate link length and distance between support points, it is possible to select an optimum swing posture of the cooling unit 6 with respect to the coolant fluid radiator 5. As indicated in the illustrated exemplary embodiments, and as explained further below, each of the links (or link members) 71, 72 is pivotally connected at two spaced-apart support points (that is, between support point pairs P1, P2 or pairs P3, P4), but not pivotally connected between the two spaced-apart support points.

In the example shown in FIGS. 1A and 1B, the cooling unit 6 includes a first cooler 6a provided opposite an upper half area of the coolant fluid radiator 5, a second cooler 6b provided on a lower side of the first cooler 6a so as to be opposite a lower half area of the coolant fluid radiator 5, and a third cooler 6c provided on the opposite side of the second cooler 6b with respect to the coolant fluid radiator 5, that is, a forward side of the second cooler 6b. The first cooler 6a is swingably supported by the coolant fluid radiator 5 via the link mechanism 7. A first end of each of the left/right pair of upper links 71 is swingably or pivotally connected to a lateral surface of the coolant fluid radiator 5 at a first support point P1, and a second end is swingably or pivotally connected to a lateral surface of the first cooler 6a at a second support point P2. Similarly, a first end of each of the left/right pair of lower links 72 is swingably or pivotally connected to the lateral surface of the coolant fluid radiator 5 at a third support point P3, and a second end is swingably or pivotally connected to the lateral surface of the first cooler 6a at a fourth support point P4. The third cooler 6c is supported by a fixed bracket 80 extending forward from a bottom end of the first cooler 6a, such that the third cooler 6c is offset in the forward direction by a difference in an anteroposterior direction width between the first cooler 6a and the second cooler 6b. Accordingly, in the first swing posture of the link mechanism 7 shown in FIG. 1A, the third cooler 6c, which is forward of the second cooler 6b, has a posture such that a slight clearance is formed between a rear surface of the third cooler 6c and a front surface of the second cooler 6b. Additionally, the rear surface of the third cooler 6c and the front surface of the second cooler 6b are substantially parallel.

The link members 71, 72 at each of the opposite lateral sides of both the cooling unit 6 and the coolant fluid radiator 5 can be considered to be respective sides of a four-sided connection device between the cooling unit 6 and the coolant fluid radiator 5. For example, as shown schematically in FIGS. 1A and 1B, link member 71 can be considered a first side of the connection device, extending between the first support point P1 and the second support point P2; link member 72 can be considered a third side of the connection device, extending between the third support point P3 and the fourth support point P4; a second side of the connection device extends between the first support point P1 and the third support point P3; and a fourth side of the connection device extends between the second support point P2 and the fourth support point P4. In addition, the second side of the connection device is fixed in relation to the coolant fluid radiator, and the fourth side of the connection device is fixed in relation to the cooling unit.

Figure 4:
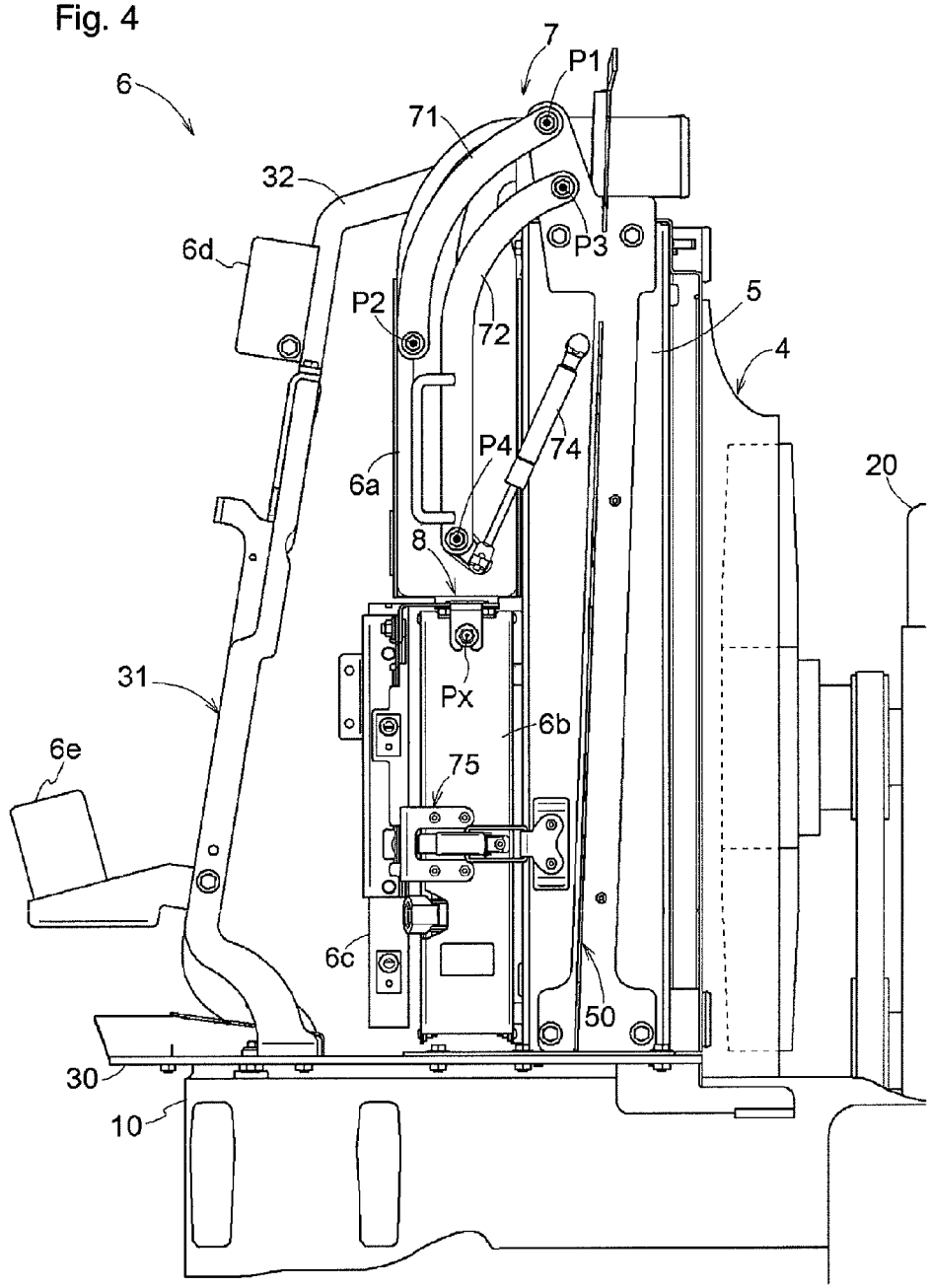
FIG. 4 is a side view illustrating a posture of the cooling system during use.
Figure 5:
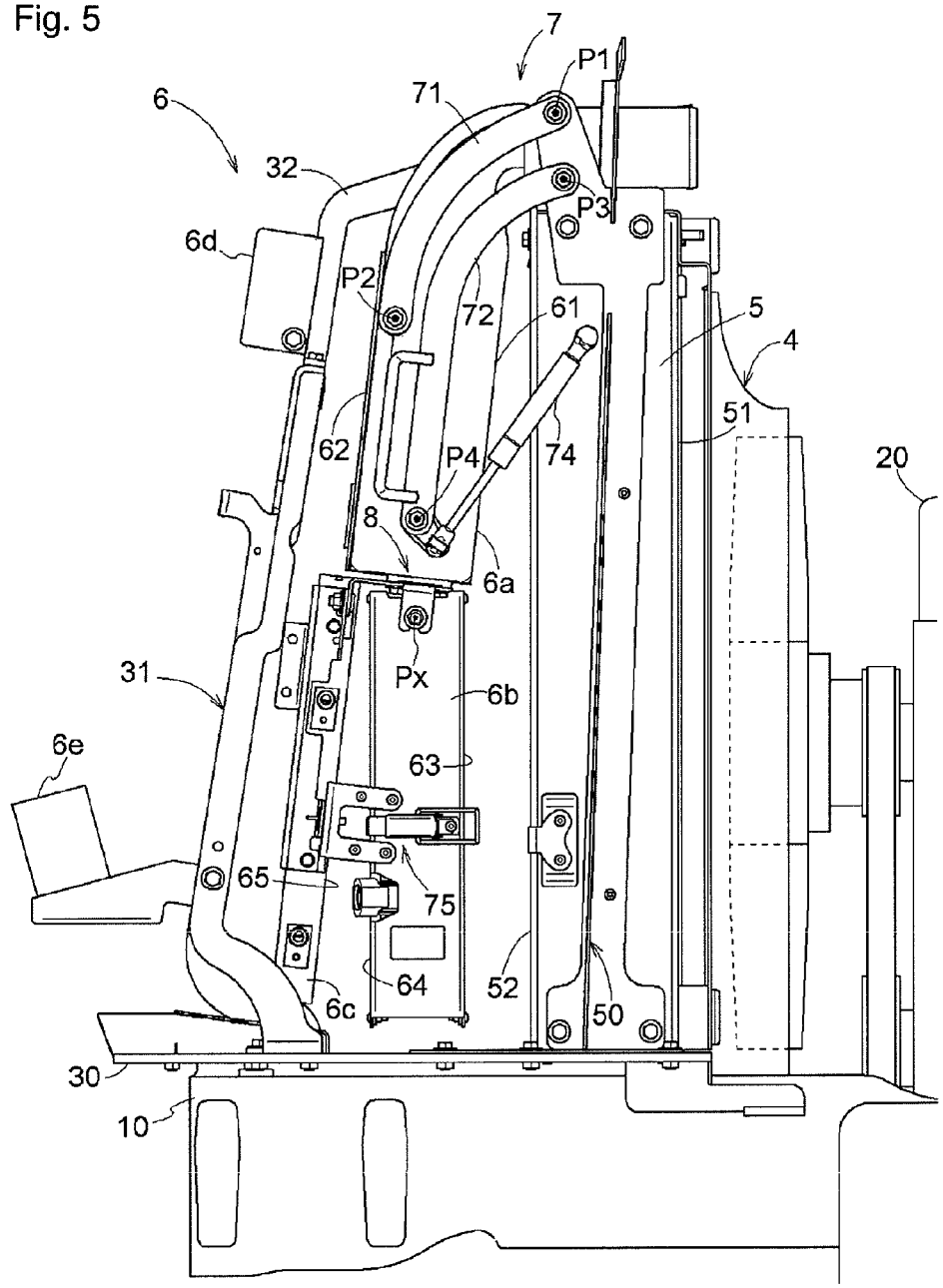
FIG. 5 is a side view illustrating the posture of the cooling system during maintenance/inspection.

A bottom end of the first cooler 6a and a top end of the second cooler 6b are serially connected in a vertical direction by a connecting unit 8. In FIG. 1B, the connecting unit 8 is configured as a swing connecting mechanism having a swing axis Px which extends in a transverse direction (perpendicular direction in the drawing). Accordingly, in the first swing posture of the link mechanism 7 shown in FIG. 1A, the second cooler 6b is positioned almost directly below the first cooler 6a due to gravity, and a rear surface of the first cooler 6a and a rear surface of the second cooler 6b form substantially a single surface which is in immediate proximity to a front surface of the coolant fluid radiator 5. In the second swing posture of the link mechanism 7 shown in FIG. 1B, the posture of the first cooler 6a is inclined such that the bottom end is separated from the coolant fluid radiator 5 in the forward direction. At this point, the second cooler 6b has a posture such that it is vertically suspended from the first cooler 6a by the connecting unit 8 and gravity, and the rear surface of the second cooler 6b and the front surface of the coolant fluid radiator 5 are nearly parallel. That is, the distance from the coolant fluid radiator 5 to the bottom end of the first cooler 6a is substantially maintained throughout the height of the second cooler 6b, ensuring a favorable clearance for maintenance/inspection purposes between the coolant fluid radiator 5 and the second cooler 6b. In addition, in both of the first and second swing postures of the cooling unit shown in FIGS. 1A and 1B, there is a vertical gap beneath the lower end of the cooling unit, such as that beneath the second cooler 6b, and an upwardly facing surface of the work vehicle, such as that of body frame 10 (FIGS. 1A, 1B) or such as the base plate 30 (FIGS. 4, 5). In the second posture of the cooling unit (FIGS. 1B, 5), the gap is increased in relation to the gap in the first posture (FIGS. 1A, 4).

The relative positional relationship between the first cooler 6a and the third cooler 6c is not changed by the swing of the link mechanism 7. Thus, in the second swing posture of the link mechanism 7 shown in FIG. 1B, the third cooler 6c is positioned following along an extension from the inclined first cooler 6a. As a result, a bottom end of the third cooler 6c and a bottom end of the second cooler 6b are separated by a distance proportionate to the angle of the second swing posture, ensuring a favorable clearance for maintenance/inspection purposes between the rear surface of the third cooler 6c and the front surface of the second cooler 6b.

The distance between the first cooler 6a and the coolant fluid radiator 5 and the angle of the first cooler 6a relative to the coolant fluid radiator 5, which are formed upon the swing of the link mechanism 7, are determined by the configuration of the link mechanism 7. Excessive distance or angle leads to interference with other devices, and therefore such distance and angle must be selected appropriately. As shown in FIG. 1B, an embodiment of the present invention is proposed in which d4>d3 and d2>d1 is established, where d3 is the distance between the first support point P1 and the third support point P3, d4 is the distance between the second support point P2 and the fourth support point P4, d1 is the length of the upper links 71, and d2 is the length of the lower links 72. Further, by adding a condition that d1>d4, the above relationship becomes d2>d1>d4>d3, and in the configuration of the cooling system shown in FIGS. 1A and 1B, a sufficient clearance for maintenance/inspection purposes can be ensured while inhibiting interference with other devices.

Figure 2:
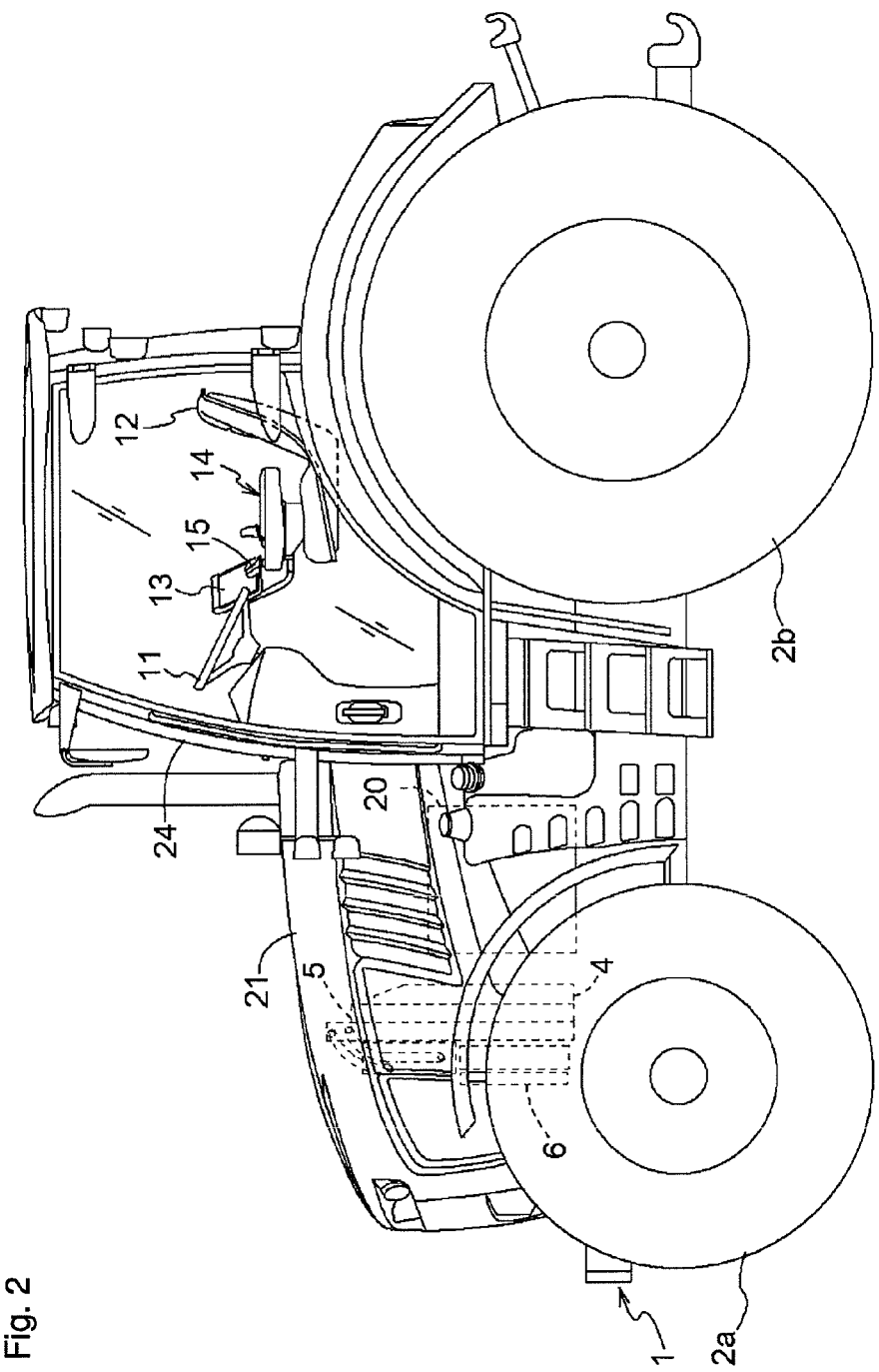
FIG. 2 is a side view of a tractor according to an embodiment of the present invention.

Next, a tractor, which is an embodiment of a work vehicle according to the present invention, is described with reference to the drawings. FIG. 2 is a side view of the tractor. The tractor includes the engine 20, which is mounted in a front portion of a vehicle body 1 of the tractor supported by front wheels 2a and rear wheels 2b, and a transmission (not shown in the drawings) is provided rearward of the engine 20. The tractor is a four-wheel-drive vehicle in which the power of the engine 20 is conveyed to the front wheels 2a and the rear wheels 2b, which are capable of performing as drive wheels, via a transmission mechanism built into the transmission. The engine 20 is covered by a hood 21. A cabin 24 is provided rearward of the hood 21.

The interior of the cabin 24 serves as an operator's compartment, with a steering handle 11 provided in a front portion to steer the front wheels 2a and an operator's seat 12 provided in a rear portion between a left/right pair of rear wheel fenders. An armrest controller 14 having a multi-function console 15 is provided along a side and up to forward of the operator's seat 12. A display 13 which visually notifies the operator of various information is provided forward of the armrest controller 14.

As shown in FIG. 2, in this embodiment, the cooling fan unit 4, coolant fluid radiator 5, and cooling unit 6, which configure the cooling system, are provided forward of the engine 20. As shown in detail in FIGS. 3, 4, and 5, this cooling system is in accordance with the basic configuration shown in FIGS. 1A and 1B. Thus, the explanation provided for FIGS. 1A and 1B is also applicable here.

The coolant fluid radiator 5 stands on a base plate 30 (see FIGS. 3-5) which is fixed to a vehicle body frame 10, and the cooling fan unit 4 is attached on a rear side of the coolant fluid radiator 5. A cooling surface 51 on a fan side (rear surface) of the coolant fluid radiator 5 is substantially parallel with and adjacent to a rotation trajectory plane of a fan of the cooling fan unit 4 (see FIG. 5). A panel-shaped partition wall frame 50 stands on the left, right, and top surfaces of the coolant fluid radiator 5, and such partition wall frame 50, in conjunction with the hood 21, separates the engine compartment and cooling system.

In this embodiment, too, the cooling unit 6 includes the first cooler 6a, second cooler 6b, and third cooler 6c. The first cooler 6a is an air intercooler, the second cooler 6b is an oil cooler, and the third cooler 6c is an AC (air conditioner) condenser.

The coolant fluid radiator 5 and the first cooler 6a are swingably connected by the four-link mechanism 7. The upper links 71 of the four-link mechanism 7 form an arc-like shape which imitates an exterior shape of a pipe portion extending from the first cooler 6a. The lower links 72 of the four-link mechanism 7 include an arc-shaped portion similar to the upper links 71 and a linear portion extending downward. First ends of the upper links 71 and lower links 72 are swingably supported by the lateral surface of the coolant fluid radiator 5 via brackets, and second ends of the upper links 71 and lower links 72 are swingably supported by the lateral surface of the first cooler 6a via swing pin bolts.

As shown in FIG. 5, when the first cooler 6a swings forward using the four-link mechanism 7, a trapezoidal space as viewed from the side is created by a first cooling surface 61, which is the rear surface of the first cooler 6a, and a cooling surface 52 on a cooling unit 6 side (entire surface) of the coolant fluid radiator 5. The pipe portion extending from the first cooler 6a is curved so as to allow this swing. Additionally, a damper 74 is provided between the coolant fluid radiator 5 and the first cooler 6a so that the first cooler 6a swings smoothly, and so as to avoid a rapid downward swing.

The first cooler 6a and the second cooler 6b are swingably connected by the connecting unit 8. The connecting unit 8 has an integrated first bracket 81 and second bracket 82. The first bracket 81 is fixed to a bottom surface of the first cooler 6a and also has a swing pin mechanism to swingably suspend the second cooler 6b. The second bracket 82 is a bracket extending downward to secure and support the third cooler 6c. While not shown in the drawing, a cushion is provided on a bottom portion of the second bracket 82 to soften contact with the second cooler 6b.

Even in the inclined state (swing state) of the first cooler 6a as illustrated in FIG. 5, the second cooler 6b maintains an upright posture due to gravity. Thus, a space is formed between a second cooling surface 63 of the second cooler 6b and the (cooling unit side) cooling surface 52 of the coolant fluid radiator 5. Similarly, a space is also formed between a second cooling surface 64 of the second cooler 6b and a first cooling surface 65 of the third cooler 6c.

During normal use of the cooling system as shown in FIG. 4, the first cooler 6a, second cooler 6b, and third cooler 6c are in a near-upright posture, and almost no clearances are formed between the first cooling surface 61 of the first cooler 6a and the (cooling unit side) cooling surface 52 of the coolant fluid radiator 5; the second cooling surface 63 of the second cooler 6b and the (cooling unit side) cooling surface 52 of the coolant fluid radiator 5; and the second cooling surface 64 of the second cooler 6b and the first cooling surface 65 of the third cooler 6c. In this state, in order to secure the second cooler 6b to the coolant fluid radiator 5 so as to be removable, a metal fastener 75, or other releasable securing mechanism, or preferably a metal snap, is provided.

Figure 3:
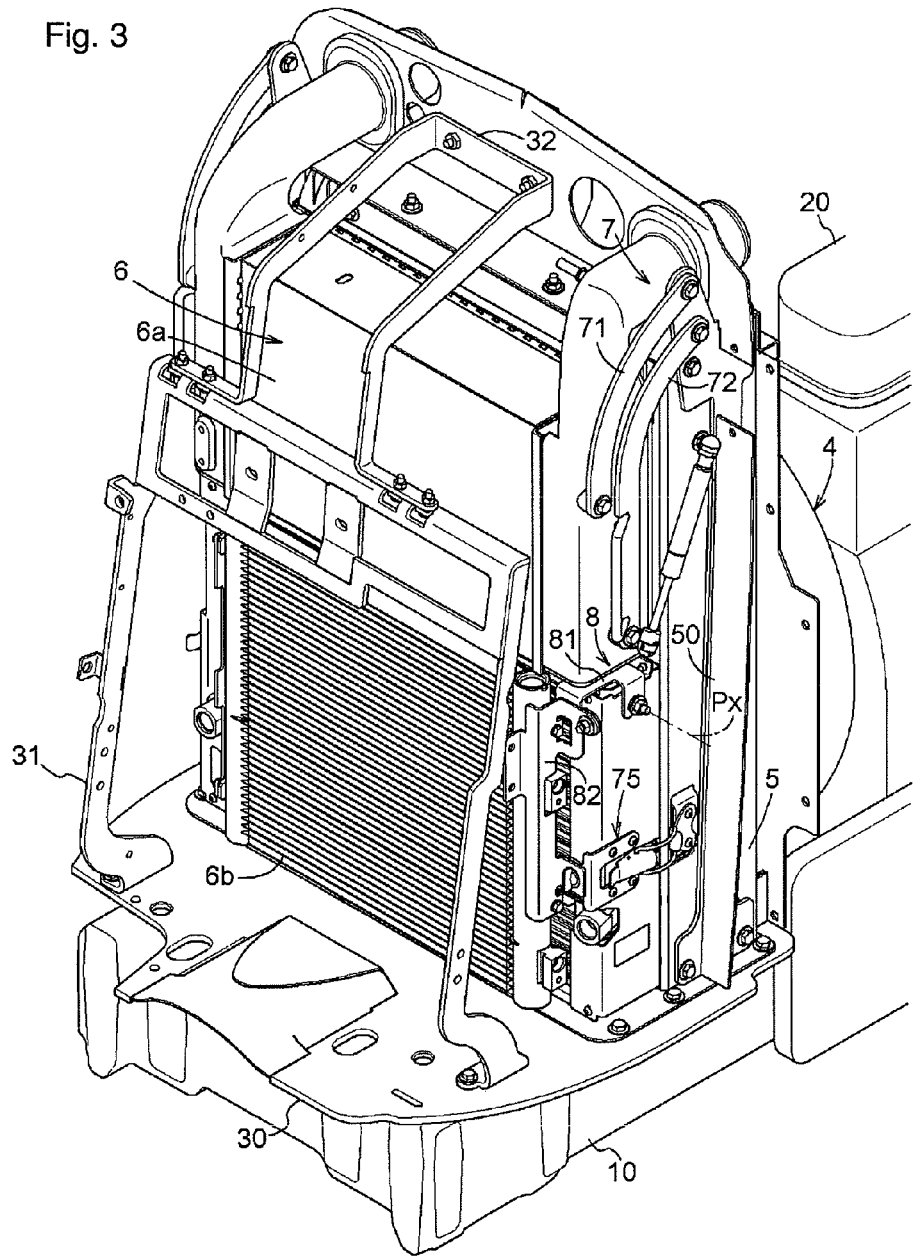
FIG. 3 is a perspective view of the cooling system.

Further, as shown in FIG. 3, a gate-shaped vertical support 31 stands forward of the third cooler 6c, and a lateral support 32 is provided which connects a top portion of the vertical support 31 and the partition wall frame 50. While illustrated only in FIG. 5, a fuel cooler 6d can be attached to a bottom portion of the lateral support 32, and a work machine cooler 6e is attached to a bottom portion of the vertical support 31.

Other Embodiments (1) In the tractor embodiment above, the engine 20 is provided forward of the operator's seat 12, and the cooling fan unit 4, coolant fluid radiator 5, and cooling unit 6 are provided forward of the engine 20, in that order. Alternatively, the cooling fan unit 4, coolant fluid radiator 5, and cooling unit 6 may be provided rearward of the engine 20, in that order. Further, the cooling system may be provided as stated above even when the engine 20 is provided rearward of the operator's seat 12. When the engine 20 is provided horizontally, the cooling system can also be provided horizontally.

(2) While the dampler 74 is used to make the first cooler 6a swing smoothly, a stopper mechanism may be provided which maintains an inclined posture of the first cooler 6a. Further, the stopper mechanism may replace the damper 74.

(3) A lock mechanism, which is capable of temporarily holding the swing angle of the second cooler 6b relative to the first cooler 6a, may be provided to the swing connecting unit 8 which connects the first cooler 6a and the second cooler 6b.

In addition to tractors, the present invention can also be applied to agricultural vehicles such as rice transplanters and combines, and construction vehicles such as front loaders.

The foregoing examples have been provided merely for the purpose of explanation and are in no way to be construed as limiting the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
   a vehicle body frame;
   an engine mounted to the vehicle body frame;
   a cooling fan unit provided on one side of the engine;
   a coolant fluid radiator provided on an opposite side of the cooling fan unit;
   a cooling unit comprising at least a first cooler provided on a side of the coolant fluid radiator opposite a side facing the cooling fan unit; and
   a link mechanism connected to the cooling unit and being structured and arranged to allow a distance between the cooling unit and the coolant fluid radiator to be changed;
   the link mechanism comprising a four-link mechanism that comprises a left upper link member, a right upper link member, a left lower link member, and a right lower link member;
   the left upper link member being pivotally connected at a first support point on an upper portion of the coolant fluid radiator and being pivotally connected at a second support point of the first cooler;
   the right upper link member being pivotally connected at a third support point on the upper portion of the cooling fluid radiator and being pivotally connected at a fourth support point of the first cooler;
   the left lower link member being pivotally connected at a fifth support point on the upper portion of the cooling fluid radiator and being pivotally connected at a sixth support point of the first cooler; and
   the right lower link member being pivotally connected at a seventh support point on the upper portion of the coolant fluid radiator and being pivotally connected at an eighth support point of the first cooler.

2. The work vehicle according to claim 1, wherein the cooling unit is arranged in front of the coolant fluid radiator and the engine in a front of the vehicle body frame.

3. The work vehicle according to claim 1, wherein the link mechanism is connected to opposite lateral sides of the coolant fluid radiator and to opposite lateral sides of the cooling unit.

4. The work vehicle according to claim 1, wherein:
the cooling unit further comprises a second cooler;
the link mechanism connects the first cooler to the coolant fluid radiator; and
a connecting unit connects a bottom end of the first cooler to an upper end of the second cooler.

5. The work vehicle according to claim 4, wherein the connecting unit swingably suspends the second cooler from the first cooler about a swing axis.

6. The work vehicle according to claim 5, wherein the swing axis is transverse to a front to back axis of the vehicle body frame.

7. The work vehicle according to claim 5, wherein the cooling unit further comprises a third cooler disposed on a side of the second cooler that is opposite a side facing the coolant fluid radiator, and said third cooler is connected to a bottom end of the first cooler.

8. The work vehicle according to claim 4, wherein the cooling unit further comprises a third cooler disposed on a side of the second cooler that is opposite a side facing the coolant fluid radiator, and said third cooler is connected to a bottom end of the first cooler.

9. The work vehicle according to claim 4, wherein:
the left upper link member comprises a first end connected to a first portion of a left side of the first cooler and a second end connected to a first portion of a left side of the coolant fluid radiator;
the right upper link member comprises a first end connected to a first portion of a right side of the first cooler and a second end connected to a first portion of a right side of the coolant fluid radiator;
the left lower link member comprises a first end connected to a second portion of the left side of the first cooler and a second end connected to a second portion of the left side of the coolant fluid radiator;
the right lower link member comprises a first end connected to a second portion of the right side of the first cooler and a second end connected to a second portion of the right side of the coolant fluid radiator.

10. The work vehicle according to claim 4, wherein a distance between the first support point and the fifth support point is less than a distance between the second support point and the sixth support point; and wherein a distance between the third support point and the seventh support point is less than a distance between the fourth support point and the eighth support point.

11. The work vehicle according to claim 4, wherein a distance between the first support point and the second support point is less than the distance between the fifth support point and the sixth support point; and wherein a distance between the third support point and the fourth support point is less than a distance between the seventh support point and the eighth support point.

12. The work vehicle according to claim 1, wherein:
the left upper link member comprises a first end connected to a first portion of a left side of the first cooler and a second end connected to a first portion of a left side of the coolant fluid radiator;
the right upper link member comprises a first end connected to a first portion of a right side of the first cooler and a second end connected to a first portion of a right side of the coolant fluid radiator;
the left lower link member comprises a first end connected to a second portion of the left side of the first cooler and a second end connected to a second portion of the left side of the coolant fluid radiator;
the right lower link member comprises a first end connected to a second portion of the right side of the first cooler and a second end connected to a second portion of the right side of the coolant fluid radiator.

13. The work vehicle according to claim 1, wherein a distance between the first support point and the fifth support point is less than a distance between the second support point and the sixth support point; and wherein a distance between the third support point and the seventh support point is less than a distance between the fourth support point and the eighth support point.

14. The work vehicle according to claim 1, wherein a distance between the first support point and the second support point is less than the distance between the fifth support point and the sixth support point; and wherein a distance between the third support point and the fourth support point is less than a distance between the seventh support point and the eighth support point.

15. The work vehicle according to claim 1, wherein the distance between the cooling unit and the coolant fluid radiator is a distance in an anteroposterior direction.

16. The work vehicle according to claim 15, further comprising a vertical gap beneath a lower end of the cooling unit and an upwardly facing surface of the work vehicle.

17. The work vehicle according to claim 16, wherein the upwardly facing surface of the work vehicle is an upwardly facing surface of a fixed base plate of the vehicle body frame.

18. The work vehicle according to claim 17, wherein the coolant fluid radiator is supported on the fixed base plate.

19. The work vehicle according to claim 16, wherein:
the cooling unit is configured to be changed between an upright posture and a swing posture by means of the link mechanism; and
in the swing posture, the vertical gap is increased in relation to the vertical gap in the upright posture.

20. The work vehicle according to claim 1, wherein:
each of the link members has a length between a respective pair of the support points; and
none of the link members is articulated along its length between a respective pair of the support points.

21. A work vehicle comprising:
a vehicle body frame;
an engine mounted to the vehicle body frame;
a cooling fan unit;
a coolant fluid radiator;
a cooling unit arranged on a side of the coolant fluid radiator opposite a side facing the cooling fan unit;
the cooling unit comprising upper cooling unit and a lower cooling unit pivotally connected to, and suspended from for gravity controlled free movement in relation to, the upper cooling unit; and
a link mechanism having ends connected to the upper cooling unit to allow the upper cooling unit to move, in relation to the coolant fluid radiator, between a first position and a second position,
wherein, in the first position, both the upper and lower cooling units are oriented in an upright posture; and
wherein, in the second position, the upper cooling unit is oriented in a posture angled away from the coolant fluid radiator and the lower cooling unit is oriented in an upright posture, thereby increasing a distance of the lower cooling unit from the coolant fluid radiator in the second position in relation to a distance in the first position.

22. A work vehicle comprising:
a vehicle body frame;
an engine mounted to the vehicle body frame;
a cooling fan unit provided on one side of the engine;
a coolant fluid radiator provided on an opposite side of the cooling fan unit;
a cooling unit provided on a side of the coolant fluid radiator opposite a side facing the cooling fan unit; and
a link mechanism connected to the cooling unit and being structured and arranged to allow a distance between the cooling unit and the coolant fluid radiator to be changed;
the link mechanism comprising a four-link mechanism that comprises a left upper link member, a right upper link member, a left lower link member, and a right lower link member;
the left upper link member being pivotally connected at a first support point at an upper portion of the coolant fluid radiator and being pivotally connected at a second support point at the cooling unit;
the right upper link member being pivotally connected at a third support point at the upper portion of the coolant fluid radiator and being pivotally connected at a fourth support point at the cooling unit;
the left lower link member being pivotally connected at a fifth support point at the upper portion of the cooling fluid radiator and being pivotally connected at a sixth support point at the cooling unit; and
the right lower link member being pivotally connected at a seventh support point at the upper portion of the coolant fluid radiator and being pivotally connected at an eighth support point at the cooling unit; and
each of the link members having a length between a respective pair of the support points; and
none of the link members is articulated along its length between a respective pair of the support points.

\* \* \* \* \*